United States Patent [19]

Kanema et al.

[11] Patent Number: 4,733,227

[45] Date of Patent: Mar. 22, 1988

[54] COLOR DISPLAY WITH AUTOMATIC COLOR CONTROL DEVICE

[75] Inventors: Seiichi Kanema, Nishitama; Shigeo Tsujioka, Higashiyamato, both of Japan

[73] Assignee: Hitachi, Ltd., Tokyo, Japan

[21] Appl. No.: 820,640

[22] Filed: Jan. 21, 1986

[30] Foreign Application Priority Data

Jan. 21, 1985 [JP] Japan .................................. 60-8907

[51] Int. Cl.$^4$ ............................................. H04N 9/68
[52] U.S. Cl. ..................................... 340/701; 358/10; 358/27; 358/28
[58] Field of Search ................... 340/701; 358/27, 28, 358/10

[56] References Cited

U.S. PATENT DOCUMENTS

| | | | |
|---|---|---|---|
| 3,962,722 | 6/1976 | Ciciora ................................. | 358/10 |
| 4,106,055 | 8/1978 | Burdick et al. ..................... | 358/27 |
| 4,167,750 | 9/1979 | Tomimoto et al. ................. | 358/27 |
| 4,551,748 | 11/1985 | Mattle ................................. | 358/10 |
| 4,602,722 | 7/1986 | Duschl ................................. | 358/10 |

*Primary Examiner*—Howard A. Birmiel
*Attorney, Agent, or Firm*—Antonelli, Terry & Wands

[57] ABSTRACT

A detector for detecting the radiation state of a display surface is disposed in a cathode ray tube in order to improve the color reproducibility of a color display. Revise order signals as standard signals are applied to obtain a difference signal between the radiation quantity of a color signal that must be displayed originally and the output signal of the detector, and a circuit for compensating for the radiation order signal is disposed in a path through which the radiation order signal is applied to the cathode ray tube.

1 Claim, 1 Drawing Figure

COLOR DISPLAY WITH AUTOMATIC COLOR CONTROL DEVICE

BACKGROUND OF THE INVENTION (1) Field of the Invention

This invention relates generally to a color display with an automatic color control device, and more particularly to a color display with an automatic color control device which is suitable for reproducing with high fidelity colors on an entire picture surface of a color CRT (cathode ray tube) display.

(2) Description of the Prior Art

In conventional color displays, colors must be adjusted if the colors change from their initial colors with the passage of time or at the initial stage, and this adjustment of color reproduction characteristics has been made manually. A color has three attributes, that is, hue, saturation and lightness. On the other hand, a display is a surface that has a two-dimensional expansion. Therefore, a great deal of time and labor of skilled workers have been necessary to adjust the colors.

Even after the adjustment is made, the colors are likely to change with time to undesirable colors within a short period. For this reason, a color display has not been employed widely for color design or the like.

The prior art reference of D. Denham and W. Meyer entitled "A High Resolution Color Display with Autoconvergence", Japan Display, '83, pp 12–14, discloses a method which automatically adjusts the deviation of radiation positions of three prime colors of red, green and blue by detecting the radiation state of the display surface of a color CRT display. However, the prior art technique including this reference have not paid any attention ot the automatic adjustment of the reproducibility of colors.

SUMMARY OF THE INVENTION

In color displays of the type which display various images on a display surface by radiation order signals of three prime color signals of red, green and blue signals, the present invention is directed to provide a color display with an automatic color control device which eliminates the problem of the prior art technique described above, which can automatically adjust color reproducibility and which can thus be used for design systems handling colors.

The color display with an automatic color control device in accordance with the present invention to accomplish the object described above is characterized by including detection means for detecting the radiation state on a color display, difference signal calculation means for calculating a difference signal between a radiation order signal and a radiation quantity and compensation means for compensating for the radiation order signal in accordance with the difference signal, in a color display which displays various images on a color display surface by the red, green and blue radiation order signals.

The above and other objects and features of the present invention will become more apparent from the following description when taken in conjunction with the accompanying drawings.

DESCRIPTION OF THE PREFERRED EMBODIMENTS

Figure 1:
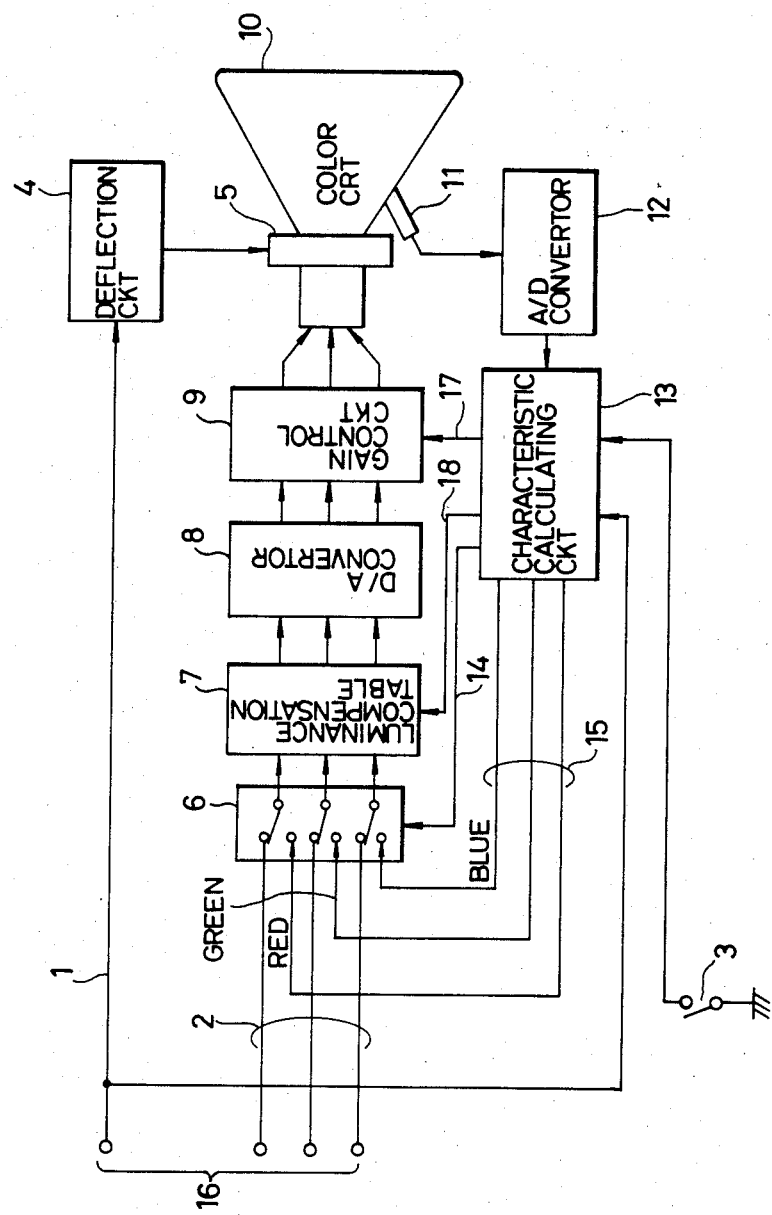
FIG. 1 is a block diagram showing the construction of a color display with an automatic color control device in accordance with an embodiment of the present invention.

FIG. 1 shows the construction of a color display with an automatic color control device in accordance with one embodiment of the present invention. In the drawing, reference numeral 1 represents a line to which horizontal and vertical sync signals for driving a deflection circuit 4 are applied. (Only one line is shown in the drawing for purpose of simplification.) Red, blue and green color signals are applied as digital signals to three lines, respectively. The deflection circuit 4 converts the sync signals to signals that determine the position of a scanning beam and applies the beam to a deflection yoke 5 in order to deflect an electron beam of a cathode ray tube (CRT) 10. Since the construction is well known in the art, the detailed description of the construction is hereby omitted.

A photo-detector 11 (such as a photo-multiplier tube) is disposed in CRT 10 and detects the radiation quantities of the red, green and blue colors at a specific position on the picture surface. The radiation quantities thus detected are converted to digital signals by an A/D conversion circuit 12 and are applied to a characteristic calculating circuit 13. When a revise order switch 43 is turned on, this characteristic calculating circuit 13 starts operating, applies standard signals of the red, green and blue components to a line 15 as the revise order signals, and supplies a switch control signal 14, a linearity compensation data 18 and a picture position compensation signal to a selector switch 6 for changing over the line 2 and the line 15, a brightness compensation table 7 and a gain control circuit 9, respectively, in accordance with sequential control for compensation.

Next, the operation of each unit will be described in detail.

First of all, a revise order switch 3 is closed so as to measure the radiation characteristics of CRT 10 and to determine a compensation quantity for the radiation order signal 2. When the switch 3 is closed, the characteristic calculating circuit 13 is in the revise mode, outputs a switch order signal 14, sets the selector switch 6 to the side of the revise order signal 15 and outputs the revise order signals of the three prime colors, i.e., red, green and blue. A variety of radiation state can be obtained by changing the output values of the revise order signal 15.

After passing through the selector switch 6, the revise order signal 15 is sent to CRT 10 through the path of the brightness compensation table 7—the D/A conversion circuit 8—the gain control circuit 9, thereby emitting the light from the surface of CRT 10. Incidentally, the brightness compensation table 7 corrects the revise order signal 15 and the radiation order signal 2 in accordance with later-appearing table values and the D/A conversion circuit 8 converts a digital quantity to an analog quantity. The gain control circuit 9 amplifies the analog quantity.

The photo-detector 11 detects the radiation state, and its detection signal is converted to the digital quantity by the A/D conversion circuit 12 and is then sent to the characteristic calculating circuit 13. The characteristic calculating circuit 13 receives the detection signal in accordance with the picture position data of the horizontal and vertical deflection signal 1 and measures the detection signal (output) with respect to the revise order signal 15 (input) at each display position of CRT 10, that is, the radiation characteristics.

The characteristic calculating circuit 13 calculates a value (linearity compensation data 18) capable of compensating for a mean deviation of a practical radiation quantity from the radiation order signal 2 (input) from the result of measurement described above, and stores the value (data 18) in the brightness compensation table 7. Incidentally, the mean deviation is obtained by averaging the deviation obtained from the radiation characteristics at each display position for one picture surface.

In the same way as described above, a gain control value capable of compensating for the deviation of the practical radiation quantity from the radiation order signal 2 (input) at each display position is calculated from the result of measurement, and is stored so that it can be outputted to the gain control circuit 9 in synchronism with the picture position data of the horizontal-vertical deflection signal 1. Here, the signal that must be outputted in synchronism with the signal 1 is the picture position characteristic compensation signal 17.

Then, the revise mode of the characteristic calculating circuit 13 is completed, and the selector switch 6 is set to the side of the radiation order signal 2. At the same time, the picture position characteristic compensation signal 17 is applied to the gain control circuit 9 in accordance with the horizontal-vertical deflection signal 1, and the gain of the radiation order signal 2 whose deviation is compensated for is adjusted by the brightness compensation table 7, thereby reproducing the radiated colors.

As described above, when an operator pushes the revise order switch 3 in this embodiment, the radiation characteristics of the color CRT display can be measured so that the mean deviation with respect to the radiation order signal 2 and the deviation of the radiation quantities at each position on the display surface can be corrected, and the picture can be displayed by the correct colors throughout the entire display surface. The change of display colors can be reproduced also by bringing the revise order switch 3 to the "close" state whenever the display is operated. As a method of eliminating the trouble of the operator, it is possible to automatically set the revise order switch 3 at the turn-on of the power source or in a predetermined interval.

In a color display which displays various images on a display surface by radiation order signals of the three prime colors of red, green and blue, the present invention makes it possible to calculate the mean deviation of the radiation characteristics and the deviation of the radiation quantities at each position on the display surface by measuring the radiation characteristics of CRT as described above. Therefore, the present invention can automatically adjust the color reproduction characteristics and can be used for a design system dealing with colors.

What is claimed is:

1. In color displays of the type which produce color pictures on a color cathode ray tube display according to radiation order signals of red, green and blue, the improvement comprising:

detection means for detecting the radiation state of the surface of said cathode ray tube;

difference signal calculation means for calculating a difference signal between the detection output of said detection means and the output corresponding to a radiation quantity that must be obtained originally and for outputting linearity compensation data that can calculate a mean deviation of a practical radiation quantity from said radiation order signals and a gain control value that can compensate for the deviation of the practical radiation quantity from said radiation order signals, from the output of said detection means, in synchronism with picture position data of a horizontal-vertical deflection signal of said cathode ray tube; and compensation means for compensating for said radiation order signals in accordance with said difference signal including a brightness compensation table storing said linearly compensation data and a gain control circuit controlling the amplification gain of the signal corrected by said compensation table in synchronism with said picture position data, between the input terminals of said radiation order signals and the input terminal of said cathode ray tube.

* * * * *